ID Patent [19]

[11] Patent Number: 4,555,565

Hsu

[45] Date of Patent: Nov. 26, 1985

[54] RING-CHAIN POLYMER CONTAINING TRIARYL-S-TRIAZINE RING AND OTHER HEAT-RESISTANT HETEROCYCLIC RINGS

[76] Inventor: Li-Chen Hsu, 6422 Grandvale, Houston, Tex. 77072

[21] Appl. No.: 480,705

[22] Filed: Mar. 31, 1983

[51] Int. Cl.[4] .............................................. C08G 73/06
[52] U.S. Cl. .................................. 528/322; 528/128; 528/229; 528/329.1; 528/353; 528/362; 528/363
[58] Field of Search ............... 528/322, 329, 229, 353, 528/362, 363, 128

[56] References Cited

U.S. PATENT DOCUMENTS 4,060,515 11/1977 D'Alelio .............................. 528/322
4,061,856 12/1977 Hsu ...................................... 528/126
4,159,262 6/1979 Hsu ...................................... 528/126
4,247,672 1/1981 Haug et al. .......................... 528/322
4,275,185 6/1981 Lu ....................................... 528/322

Primary Examiner—Harold D. Anderson
Attorney, Agent, or Firm—J. Helen Slough

[57] ABSTRACT

A non-cross-linked or partly cross-linked triaryl-s-triazine ring containing polymer or copolymer is prepared by cyclopolymerizing an aromatic nitrile-modified oligomer or precursor in the presence of excess molar amounts of aromatic nitrile at temperatures above 100° C. to provide a non-cross-linked triaryl-s-triazine extended chain structure. The excess moles of aromatic nitriles above that required to endcap the oligomer results in an extended chain structure. The polymers are useful as a matrix laminating resin in composites containing carbon fibers and similar refractory filler materials to produce desirable refractory materials exhibiting thermal-oxidative stability at elevated temperatures.

9 Claims, No Drawings

RING-CHAIN POLYMER CONTAINING TRIARYL-S-TRIAZINE RING AND OTHER HEAT-RESISTANT HETEROCYCLIC RINGS

This invention pertains to triaryl-s-triazine ring-chain polymers and other high temperature resistant heterocyclic ring polymers, and more particularly to non-cross-linked triaryl-s-triazine ring-chain polymers substantially free of cross-linking and containing a chain extension structure. The polymers are useful as matrix laminating resins in composites containing carbon fibers and similar refractory filler materials to produce desirable refractory materials exhibiting thermal-oxidative stability at elevated temperatures.

Catalytic trimerization of aromatic nitrile-modified imides, benzimidazoles, imidazopyrrolones, quinoxalines, and other condensation polymers into triaryl-s-triazine cross-linked polymeric products are shown in Hsu U.S. Pat. No. 4,061,856 and Hsu U.S. Pat. No. 4,159,262, and the disclosures thereof are incorporated herein by reference. Complete cross-linking via triazine ring formation results in a ring-chain structure and such polymers reach maximum rigidity when substantially all of the triaryl-s-triazine components are completely cross-linked. Although these types of fully cross-linked ring-chain polymers exhibit desirable ultra high thermostability, such polymers provide undesirable brittleness.

It now has been found that substantially non-cross-linked triaryl-s-triazine polymers and co-polymers can be produced by reacting certain nitrile terminated and/or appended oligomers with excess molar amounts of aromatic nitrile in excess to the molar amounts required to cap the oligomers. Use of the excess molar amounts of aromatic nitrile surprisingly prevents cross-linking and promotes formation of polymer chain extension rather than the cross-linking structure shown in said Hsu patents U.S. Pat. No. 4,061,856 and U.S. Pat. No. 4,159,262. In accordance with this invention, the cross-linking density of the triaryl-s-triazine polymer decreases as the amount of excess equivalents of aromatic nitrile increases to advantageously provide increased flexibility and resilient toughness in the polymer structure while maintaining the very desirable high thermostability properties. These and other advantages of this invention will become more apparent from the detailed description of the invention.

Briefly, in accordance with this invention, non-cross-linked ring-chain polymers containing triaryl-s-triazine rings and similar heat resistant heterocyclic rings are produced by catalytic cyclopolymerization or polycyclotrimerization of oligomers capped with aromatic nitriles. Use of excess aromatic nitrile in amounts in excess to the molar amounts necessary for capping the oligomers produces a non-cross-linked 1,3,5-triaryl-s-triazine ring-chain structure particularly containing an extended chain structure described as a ring-chain non-cross-linked chain structure. Preferably the excess aromatic nitrile is an aromatic nitrile different than the aromatic nitrile used to cap the oligomers. Other reactive aromatic nitrile with no other functional group can be similarly used as the excess aromatic nitrile.

The preparation of triaryl-s-triazine polymers by reacting certain capped oligomers in the presence of excess molar amounts of aromatic nitrile produces in accordance with this invention non-cross-linked triaryl-s-triazine ring-chain polymers particularly exhibiting chain extension structures. Aromatic nitrile-modified (terminated and/or appended) benzimazole, imidazopyrrolone, quinoxaline and similar aromatic nitrile capped condensation type prepolymers or precopolymers can be catalytically trimerized to form non-cross-linked triaryl-s-triazine polymers in accordance with this invention.

Trimerizable aromatic nitrile compounds are trimerized to form triazine rings by heating the aromatic nitriles under moderate pressure and substantially anhydrous conditions with a catalyst selected from the group including sulfonic and sulfinic acids, organic phosphonic and phosphinic acids, and metallic acetylacetonates, etc. Examples of such catalysts include p-toluene sulfonic acid, benzene sulfonic and sulfinic acid, naphthalene sulfonic acids, trichloromethyl phosphonic acid, phenyl phosphonic acid, phenyl phosphinic acid, ferric acetylacetone, zinc acetylacetone, and similar catalysts. In general, catalyst concentrations are within the range of between about 0.01 to 10 mole percent and preferably between 0.05 and 5 mole percent based on the molar amount of aromatic nitrile.

Aromatic nitrile compounds capable of trimerizing to form triazines can include for example benzonitrile, napthonitrile, cyanoanthracene, and cyanoheterocyclic compounds which can be substituted with alkyl, alkoxy, halogen, nitro, cyano, carbonyl, sulfonyl, or carboxyl groups. Preferred aromatic nitriles are benzonitriles with electron withdrawing substituents such as carbonyl or nitro groups.

The aromatic nitriles can be trimerized to form triaryl-s-triazine compounds such as 2,4,6-tris(carboxyphenyl)-1,3,5-triazine; 2,4,6-tris(3',4'-phthalic anhydride)-1,3,5-triazine; 2,4,6-tris(aminophenyl)1,3,5-triazine; 2,4,6-tris(3',4'- or 3',5'-diaminophenyl)-1,3,5 triazine; 2,4,6-tris(phthalimidyl)-1,3,5 triazine and similar substituted or derivative triazines.

Aromatic nitrile modified precursors can be produced from oligomers such as imide, benzimidazole, imidazopyrrolone, and quinoxaline, etc., and may include aromatic nitrile endcapped arylenes, arylenesulfides, arylethers, arylketones, arylsulfones, siloxanes, and similar heat resistant compounds.

In accordance with this invention, non-cross-linked triaryl-s-triazines extended chain polymers are formed by utilizing an excess molar amount of aromatic nitrile required to cap the oligomer or precursor used in the process. Excess molar amounts of aromatic nitrile appear to block or otherwise prevent cross-linking and results in non-cross-linked extended chain polymers in accordance with this invention. An endcapped oligomer can be represented as follows:

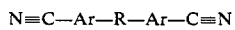

Wherein R can be imide, benzimidazole, imidazopyrrolone, or quinoxaline oligomers etc., and Ar is an aryl radical. Preferably, the excess aromatic nitrile used in excess beyond that required for capping is an aromatic nitrile different than the aromatic nitrile used for capping the oligomer. The theoretic chemical balance equation for reaction of excess equivalents of aromatic nitrile to produce a non-cross-linked chain polymer can be illustrated as follows:

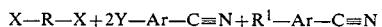

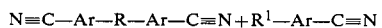

Where
R = oligomer of imide, benzimidazole, imidazapyrrone, quinoxaline or other radicals;
$R^1$ = $NH_2$, $(CO_2)_2O$, $(NH_2)_2$, COOH, H,F, $CF_3$, $NO_2$, $SO_3H$, $SO_2H$, $PO(OH)_2$, or disubstitutes thereof;
Ar = aryl radical The disubstitutes in $R^1$ can be $(NO_2)_2$ or $(SO_3H)_2$ in the meta position to each other and to the C≡N group. Preferred aromatic nitriles utilized in excess equivalents beyond the amount required for capping can include for example:

HOOC—Ar—CN or (HOOC)$_2$—Ar—CN:
$H_2N$—Ar—CN or $(H_2N)_2$—Ar—CN;
$(CH_3)_2N$—Ar—CN;
Ar—CN or F—Ar—CN or $F_3C$—Ar—CN or $(F_3C)_2$—Ar—CN;
$NO_2$—Ar—CN or $(NO_2)_2$—Ar—CN;
$HOSO_2$Ar—CN or $(HOSO_2)_2$—Ar—CN;
or cyanopyridine.

The excess molar amounts of aromatic nitrile utilized in excess of the molar equivalents necessary for capping terminal and/or appended groups can be between about 5 mole percent and 50 mole percent excess moles based on the moles required to cap the oligomer. Excess aromatic nitrile above the molar amounts required to cap the imide oligomer takes part in polycyclotrimerization leading to chain termination whereby the excess aromatic nitrile causes chain extension to occur and avoids cross-linking resulting in a ring-chain backbone with an extending chain structure. Cross-linking if any decreases with increased amounts of aromatic nitrile above the 5% molar excess level. Thus, flexibility and resiliency with substantially increased flexural strengths can be achieved by controlling the cross-linking density in accordance with this invention. Rigidity and brittleness are avoided and more useful resilient structures are achieved.

The non-cross-linked triaryl-s-triazine ring containing polymers can be produced by reacting aromatic nitrile capped oligomer with an excess amount of aromatic nitriles in the presence of a trimerization catalyst for time sufficient to permit trimerization to be essentially completed which typically depends on the amount of catalyst, the reaction temperature, pressure, and the reactants. Reaction pressures may be used and can range between atmospheric and as high as 10,000 psi although preferred pressures are between 50 psi and 1000 psi. The aromatic nitriles and aromatic nitrile capped oligomers can be trimerized to triaryl-s-triazine ring containing chain polymers by reacting the reactants at temperatures between 100° C. to 700° C. and preferably between 200° C. to 350° C. An inert organic solvent can be utilized if desired wherein the reactants and catalyst are soluble. Suitable solvents can include N-methylpyrrolidone, N, N-dimethyl formamide, dimethylsulfoxide, cresols, alcohols, and 1,2-dichloroethane. Thus, non-cross-linked or partly cross-linked triaryl-s-triazine ring containing polymers can be prepared by capping the oligomer with an appropriate aromatic nitrile preferably containing electron withdrawing substitutents such as an acid or an anhydride group followed by cyclotrimerizing with an excess amount of aromatic nitriles in the presence of a trimerization catalyst such as p-toluene sulfonic acid at about 350° C. and 1000 psi for time sufficient to produce the triazine rings. In accordance with this invention, aromatic nitrile capped oligomers are reacted in the presence of excess molar amounts of aromatic nitrile beyond the molar amounts required for capping produce a non-cross-linked or partly cross-linked triaryl-s-triazine extended chain polymer.

The foregoing illustrates the merits of this invention wherein partly-cross-linked thermostable triaryl-s-triazine chain polymers are produced in the presence of excess amounts of aromatic nitrile to provide more desirable polymers exhibiting substantially improved flexibility and resilient toughness. The description disclose preferred embodiments but are not intended to limit the scope of invention except as defined in the appended claims.

What I claim is:

1. In a process for preparing triaryl-s-triazine ring containing polymers by heating together a aromatic nitrile with an aromatic nitrile appended or terminated oligomer, the improvement comprising:

contacting a mole percent excess of said aromatic nitrile with said aromatic nitrile terminated or appended oilgomer selected from imide, benzimiazole, imidazopyrone, or quinoxaline nitrile-modified oligomers, the mole percent of said aromatic nitrile being in at least 5 mole percent in excess of the moles of said aromatic nitrile required to react with said aromatic nitrile terminated or appended oligomer, and reacting said aromatic nitrile with said aromatic nitrile terminated or appended oligomer to produce a nitrile capped oligomer; and cyclotrimerizing said nitrile-capped oligomer and excess aromatic nitrile mixture in contact with a trimerization catalyst at temperatures above 100° C. and at pressures above 200 PSI to produce a partly crosslinked or substantially non-crosslinked triaryl-s-triazine ring containing chain extended polymer.

2. The process in claim 1 wherein the mole percent excess of aromatic nitrile comprises an aromatic nitrile different than the aromatic nitrile for capping the oligomer.

3. The process in claim 1 wherein the mole percent excess of aromatic nitrile is between 5% and 50% mole excess greater than required for capping the oligomer.

4. The process in claim 1 wherein the mole percent excess of aromatic nitrile is selected from a compound having a structure HOOC—Ar—CN or (HOOC)$_2$—Ar—CN.

5. The process in claim 1 wherein the mole percent excess of aromatic nitrile is selected from a compound having the structure $H_2N$—Ar—CN or $(H_2N)_2$—Ar—CN.

6. The process in claim 1 wherein the mole percent excess of aromatic nitrile is a compound having the structure $(CH_3)_2$—N—Ar—CN.

7. The process in claim 1 wherein the mole percent excess of the aromatic nitrile is selected from a compound having the structure Ar—CH, F—Ar—CN, $F_3C$—Ar—CN, or $(F_3C)_2$—Ar—CN.

8. The process in claim 1 wherein the mole percent excess of aromatic nitrile is selected from a compound having the structure $HOSO_2$—Ar—CN or $(HOSO_2)_2$—Ar—CN.

9. The process in claim 1 wherein the mole percent excess of aromatic nitrile is cyanopyridine.

* * * * *